| United States Patent [19] | [11] | 4,245,067 |
|---|---|---|
| Maekawa et al. | [45] | Jan. 13, 1981 |

[54] THERMOSETTING RESIN COMPOSITION

[75] Inventors: Iwao Maekawa; Akira Kageyama; Uchigasaki, Isao, all of Hitachi, Japan

[73] Assignee: Hitachi Chemical Company, Ltd., Japan

[21] Appl. No.: 96,389

[22] Filed: Nov. 21, 1979

[30] Foreign Application Priority Data

Dec. 11, 1978 [JP] Japan ................ 53-153347

[51] Int. Cl.$^3$ .............................................. C08G 18/62
[52] U.S. Cl. ........................................ 525/440; 528/74; 528/75
[58] Field of Search .............. 525/440; 528/74, 75

[56] References Cited

U.S. PATENT DOCUMENTS

| 4,097,439 | 6/1978 | Darling | 525/440 |
| 4,130,546 | 12/1978 | Goto et al. | 528/75 |
| 4,180,645 | 12/1979 | Emmons et al. | 528/74 |

Primary Examiner—Maurice J. Welsh
Attorney, Agent, or Firm—Craig & Antonelli

[57] ABSTRACT

A thermosetting resin composition comprising (I) a polybutadiene derivative obtained by conducting reaction of (A) a compound having active hydrogen obtained by reacting dicyclopentadiene or hydroxylated dicyclopentadiene with maleic anhydride or acid to yield partially esterified dicyclopentadienecarboxylic acid, which is further reacted with monoglycidyl ether or ester, (B) a butadiene homopolymer or copolymer having one or more hydroxyl groups and number average molecular weight of 1000 to 5000, and (C) a diisocyanate in ratios in terms of functional group equivalent ratio of (A)/(B)/(C) being 0.6–1.0/1.0/1.2–2.0, and (II) a polymerizable monomer having at least one polymerizable double bond in the molecule can be handled easily and cured at normal temperatures to give cured articles having good properties without losing excellent properties of polybutadiene as elastomer.

9 Claims, No Drawings

THERMOSETTING RESIN COMPOSITION

BACKGROUND OF THE INVENTION

This invention relates to a thermosetting resin composition, and more particularly relates to a thermosetting resin composition obtained by dissolving a polybutadiene which is a backbone chain containing pendant tricyclodecenyl-α,β-unsaturated groups having polymerizable double bonds in a polymerizable monomer and having good workability.

Polybutadienes having hydroxyl groups and a number average molecular weight of about 1000 to 5000 are called liquid polybutadienes and have fluidity at normal temperatures, so that they are tried to be used in various applications such as, by using as a chain extender isocyanates, sealants, caulking materials, adhesives, potting materials, paints, and the like. This is also because liquid polybutadienes have good elastomeric properties, adhesiveness, and electrical properties. Although they have fluidity, their viscosity at 25° C. are 50 to 600 poises and further toxicity of isocyanates becomes a recent problem to be solved. Therefore, liquid polybutadienes are not used for general purposes.

On the other hand, Japanese Patent Appln. Kokoku (Post-Exam Publn.) Nos. 26950/71 and 8261/73 propose processes for producing thermosetting resins having good workability by using polybutadienes having functional groups in place of the alcohol component or the acid component of unsaturated polyesters so as to improve brittleness of conventional unsaturated polyesters, said brittleness being a defect of unsaturated polyesters, without decreasing properties of polybutadienes. But according to the process of Japanese Patent Appln. Kokoku (Post-Exam Publn. ) No. 26950/71, gelation easily takes place during the esterification reaction due to the double bonds of polybutadiene, so that sufficient degree of condensation cannot be obtained and thus the properties of polybutadienes hardly be applied. According to the process of Japanese Patent Appln. Kokoku (Post-Exam Publn.) No. 8261/73, since a hydrogenated polybutadiene is used in order to improve the defect mentioned above, production cost becomes expensive. Therefore, the two processes mentioned above are not used for general purposes.

Japanese Patent Appln. Kokoku (Post-Exam Publn.) No. 16195/72 discloses a process for producing a thermosetting resin having excellent workability by using a polybutadiene having active hydrogen and an isocyanate and introducing acryl or methacryl groups into the resin. But since the acryl or methacryl group generally has poor copolymerizability with styrene and the like, rapid and sufficient curing at normal temperatures cannot be obtained unlike unsaturated polyester resins and physical properties of the resulting cured articles are also insufficient.

Thus general-purpose thermosetting polybutadienes without losing excellent properties of polybutadienes as elastomer, having excellent workability and being easily cured at normal temperatures, in other words, being easily handled, have long been desired.

The present inventors have extensively studied modification of polybutadienes and accomplished this invention by providing a thermosetting resin composition improved in the defects mentioned above.

SUMMARY OF THE INVENTION

This invention provides a thermosetting resin composition comprising
(I) a polybutadiene derivative obtained by reacting
(A) a compound having active hydrogen obtained by reacting dicyclopentadiene or hydroxylated dicyclopentadiene with maleic anhydride or maleic acid to yield partially esterified dicyclopentadienecarboxylic acid, which is further reacted with a monoglycidyl ether or monoglycidyl ester,
(B) a polybutadiene homopolymer or butadiene copolymer having one or more hydroxyl groups and number average molecular weight of 1000 to 5000, and
(C) a diisocyanate in ratios 0.6–1.0/1.0/1.2–2.0 in terms of functional group equivalent ratio of (A)/(B)/(C) and
(II) a polymerizable monomer having at least one polymerizable double bond in the molecule.

DETAILED DESCRIPTION OF THE INVENTION

The partially esterified dicyclopentadienecarboxylic acid, the intermediate of the compound (A), is represented by the following formula:

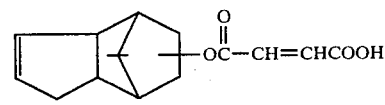

and can be produced by reacting about equimolar amounts of dicyclopentadiene and maleic acid at 150° C. or lower and preferably 80° C. or higher, more preferably at 130° C. for 2 to 4 hours, or alternatively reacting about equimolar amounts of hydroxylated dicyclopentadiene and maleic anhydride at 150° C. or lower and preferably 80° C. or higher, more preferably at 130° C. for 3 to 7 hours.

The reaction between the partially esterified dicyclopentadienecarboxylic acid and a monoglycidyl ether or monoglycidy ester can be carried out by charging equimolar amount or 5 to 10% by mole in excess of the monoglycidyl ester or ether per mole of the partially esterified dicyclopentadienecarboxylic acid and reacting at 200° to 220° C. in the absence of a catalyst or at 80° to 120° C. in the presence of a catalyst of, e.g. a quaternary ammonium salt in an amount of 0.1 to 0.3% by weight based on the weight of the partially esterified dicyclopentadienecarboxylic acid and the monoglycidyl ether or ester, until the compound having active hydrogen of an acid number of 15 or less is obtained. The acid number is measured according to JIS K 6901. Preferable acid number is 10 or less.

Examples of monoglycidyl ethers are n-butylglycidyl ether, phenylglycidyl ether, meta- or paracresylglycidyl ether, allylglycidyl ether, and the like.

Examples of monoglycidyl esters are glycidyl methacrylate, glycidyl ester of Versatic acid, and the like. Versatic acid can be represented by the formula:

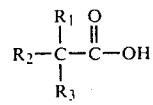

wherein $R_1$, $R_2$ and $R_3$ are independently alkyl groups, one of which is a methyl group.

The butadiene homopolymer or copolymer (B) may be any ones which have one or more hydroxyl groups and have a number average molecular weight of 1000 to 5000. There is no limitation to proportions of 1,2- and 1,4-bonds. Examples of butadiene copolymers are styrene-butadiene copolymer, acrylonitrile-butadiene copolymer, acrylonitrile-butadiene-styrene copolymer, and the like. Commercially available examples of these butadiene homopolymers and copolymers are Nisso PB G grade (Nippon Soda Co., Ltd.), Poly bd R-45, CS-15, CN-15, and the like (ARCO Chemical Co.).

As the diisocyanate (C), there can be used aliphatic diisocyanates such as ethylene diisocyanate, propylene diisocyanate, butylene diisocyanate, hexamethylene diisocyanate, and the like; aromatic diisocyanates such as 2,4-tolylene diisocyanate, 2,6-tolylene diisocyanate, 4,4'-diphenylmethane diisocyanate, p- or m-phenylene diisocyanate, and the like; alicyclic diisocyanates such as cyclohexylene diisocyanate, and the like.

The components (A), (B) and (C) should be used in amounts of 0.6 to 1.0/1.0/1.2 to 2.0 in terms of functional group equivalent ratio. If the amount of (A) is less than 0.6 equivalent or the amount of (C) is less than 1.2 equivalent per equivalent of (B), curing properties become poor and properties of cured articles decrease. On the other hand, if the amount of (A) is more than 1.0 equivalent or the amount of (C) is more than 2.0 equivalents per equivalent of (B), pendant reactants to the polybutadiene backbone increase.

The urethanizing reaction of the components (A), (B) and (C) in the functional group equivalent ratio as mentioned above can be carried out in the absence of a catalyst or in the presence of a catalyst such as an organotin at a temperature of 150° C. or less, preferably 50° to 100° C., so as not to bring about side reactions other than the desired urethanizing reaction. If desired, the urethanizing reaction can be carried out by using as a solvent the polymerizable monomer having at least one polymerizable double bond in the molecule (II) mentioned below.

As the polymerizable monomer having at least one polymerizable double bond in the molecule (II), there can be used styrene, divinylbenzene, vinyltoluene, methyl acrylate, methyl methacrylate, ethyl acrylate, ethyle methacrylate, Carbitol acrylate, Carbitol methacrylate, diallyl phthalate, acrylates or methacrylates of ethylene glycol, 1,3- or 1,4-butanediol, 1,6-hexanediol, neopentyl glycol, and the like.

These polymerizable monomers having at least one polymerizable double bond in the molecule (II) can be used alone or as a mixture of two or more of them depending on curing methods of the compositions, workability, desired properties of the cured articles, and the like. Preferable amount of the polymerizable monomer (II) is 10 to 50% by weight based on the weight of the polybutadiene derivative (I).

The thermosetting resin composition of this invention can be cured by heat curing using a peroxide, redox curing using a peroxide and a curing accelerator, ultraviolet curing, far infrared curing, and the like. In the case of the ultraviolet curing, a conventional photosensitizer should be added to the composition.

As the peroxides, there can be used conventional ones such as benzoyl peroxide, methyl ethyl ketone peroxide, di-tertiary-butyl peroxide, lauroyl peroxide, cumene hydroperoxide, tertiary-butyl peroxide and the like. As the curing accelerators, there can be used metallic soaps of cobalt, copper, manganese, lead and the like, tertiary amines, β-diketones, and the like. There is no particular limitation to the amount of them to be used nor the method of using them.

The thermosetting resin composition of this invention may further contain, if necessary, fillers such as calcium carbonate, silica sand, talc, kaolin, etc., pigments, dyes, and fibrous reinforcing materials such as carbon fibers, glass fibers, polyvinyl alcohol fibers, polyester fibers, etc. In addition, the thermosetting resin composition of this invention may further contain other polymers such as unsaturated polyesters, alkyd resins, and the like so far as the objects of this invention are not spoiled by these resins.

The thermosetting resin composition of this invention can widely be used for electrical insulating casting, coil impregnation varnishes, fiber glass reinforced plastics for electrical insulation, anti-corrosion fiber glass reinforced plastics, corrugated sheet, adhesives, and the like.

This invention is illustrated by way of the following Examples, in which all parts and percents are by weight unless otherwise specified.

EXAMPLES 1 AND 2

(1) Synthesis of the compound (A)

(a) In a 5-liter four-necked flask equipped with a condenser, a nitrogen introducing pipe, a thermometer, and a stirrer, 1200 parts of hydroxylated dicyclopentadiene and 784 parts of maleic anhydride were placed and reacted at 130° C. for 4 hours under nitrogen stream while taking care of generation of heat at the initial stage to give partially esterified dicyclopentadienecarboxylic acid (tricyclodecenyl monomaleate) having an acid number of 220. To the product, 1824 parts of monoglycidyl ester of Versatic acid (Cardura E 10 manufd. by Shell Chemical Corp.) was added and the contents of the flask were heated to 210° C. in 3 hours and the reaction was continued for further 3 hours to give the compound (A)-(a) having an acid number of 7.1, a hydroxyl number of 125.

(b) Using the same apparatus as mentioned in above 1 (a), 1200 parts of hydroxylated dicyclopentadiene and 784 parts of maleic anhydride were reacted at 130° C. for 4 hours under nitrogen stream while taking care of generation of heat at the initial stage to give partially esterified dicyclopentadienecarboxylic acid (tricyclodecenyl monomaleate) having an acid number of 224. To this product, 912 parts of allylglycidyl ether (Sakamoto Yakuhin K.K.) was added and the reaction was conducted at 180° C. for 8 hours to give the compound (A)-(b) having an acid number of 9.2 and a hydroxyl number of 165.

(2) Urethanization reaction and preparation of compositions (a) In a 2-liter four-necked flask equipped with a condenser, a nitrogen introducing pipe, a thermometer, and a stirrer, 1000 parts of hydroxylated polybutadiene having a hydroxyl number of 86 (Nisso PB G1000, manufd. by Nippon Soda Co., Ltd.), 260 parts of 2,4-tolylene diisocyanate (Japan Polyurethane Co.), 714 parts of the compound (A)-(a), and 1 part of dibutyl tin dilaurate were placed and reacted at a temperature not exceeding 60° C. while taking care of generation of heat for 6 hours to give a polybutadiene derivative containing 0.4% of remaining NCO. To this, 800 parts of styrene and 0.3 g of para-benzoquinone were added and there was obtained a light yellow varnish (V$_1$) dissolved in the styrene. (Example 1)

(b) Using the same apparatus as mentioned in above 2 (a), 1000 parts of hydroxylated polybutadiene having a hydroxyl number of 46.6 (Poly bd R-45 HT, manufd. by ARCO Chemical Co.), 134 parts of hexamethylene diisocyanate, 300 parts of the compound (A)-(b), and 0.5 g of dibutyl tin dilaurate were placed in the flask and reacted at 70° C. for 4 hours while taking care of generation of heat to give a polybutadiene derivative containing 0.25% of remaining NCO. To this, 500 parts of styrene and 0.2 g of para-benzoquinone were added and there was obtained a light yellow varnish (V$_2$) dissolved in styrene. (Example 2)

To the varnish V$_1$ or V$_2$, 0.5% of cobalt octoate (cobalt content 6%) and 1.0% of methyl ethyl ketone peroxide were added and cured at 25° C. for 24 hours.

Various properties of the varnish and cured resin are as shown in the following table.

| Example No. | 1 | 2 |
| --- | --- | --- |
| Varnish | V$_1$ | V$_2$ |
| Viscosity (25° C., Gardner poise) | 3.8 | 4.2 |
| Gelation time (25° C.) (min) | 35 | 30 |
| Surface hardness (Shore D)*$^1$ | 40 | 40 |
| Tack of the surface*$^1$ | None | None |
| Tensile strength*$^2$ (kg/cm$^2$) | 190 | 250 |
| Tensile elongation*$^2$ (%) | 94 | 89 |
| tan δ*$^3$ (%) 25° C. | 2.1 | 2.5 |
| 100° C. | 3.0 | 3.2 |
| Volume resistivity*$^3$ 25° C. | 6.2 × 10$^{15}$ | 2.6 × 10$^{15}$ |
| 100° C. | 1.8 × 10$^{13}$ | 9.3 × 10$^{12}$ |

(Note)
*$^1$Samples were prepared by pouring a varnish into a metallic dish having a diameter of 60 mm and a thickness of 14 mm and curing it.
*$^2$Samples were prepared by pouring a varnish into a casting board of 3 mm thick and curing it. Test method: JIS K 6911.
*$^3$Samples were prepared by pouring a varnish into a casting board of 2 mm thick and curing it. Test method: JIS K 6911.

As is clear from the table, the thermosetting resin composition of this invention has a low viscosity and is easily handled, and also is easily and completely cured at normal temperatures without lowering flexibility of polybutadiene. Thus the thermosetting resin composition of this invention is very excellent.

What is claimed is:

1. A thermosetting resin composition comprising
(I) a polybutadiene derivative obtained by reacting
  (A) a compound having active hydrogen obtained by reacting dicyclopentadiene or hydroxylated dicyclopentadiene with maleic anhydride or maleic acid to yield partially esterified dicyclopentadienecarboxylic acid, which is further reacted with monoglycidyl ether or monoglycidyl ester,
  (B) a polybutadiene homopolymer or butadiene copolymer having one or more hydroxyl groups and number average molecular weight of 1000 to 5000, and
  (C) a diisocyanate
in ratios 0.6–1.0/1.0/1.2–2.0 in terms of functional group equivalent ratio of (A)/(B)/(C) and
(II) a polymerizable monomer having at least one polymerizable double bond in the molecule.

2. A thermosetting resin composition according to claim 1, wherein the monoglycidyl ether is n-butylglycidyl ether, phenylglycidyl ether, meta- or para-cresylglycidyl ether or allylglycidyl ether.

3. A thermosetting resin composition according to claim 1, wherein the monoglycidyl ester is glycidyl methacrylate or glycidyl ester of Versatic acid.

4. A thermosetting resin composition according to claim 1, wherein the butadiene copolymer is styrene-butadiene copolymer, acrylonitrile-butadiene copolymer or acrylonitrile-butadiene-styrene copolymer.

5. A thermosetting resin composition according to claim 1, wherein the diisocyanate is ethylene diisocyanate, propylene diisocyanate, butylene diisocyanate, hexamethylene diisocyanate, 2,4-tolyene diisocyanate, 2,6-tolylene diisocyanate, 4,4'-diphenylmethane diisocyanate, p- or m-phenylene diisocyanate, or cyclohexylene diisocyanate.

6. A thermosetting resin composition according to claim 1, wherein the polymerizable monomer having at least one polymerizable double bond in the molecule is styrene, divinylbenzene, vinyltoluene, methyl methacrylate, methyl acrylate, ethyl acrylate, ethyl methacrylate, diallyl phthalate.

7. A thermosetting resin composition according to claim 6, wherein the polymerizable monomer is styrene.

8. A process for producing a thermosetting resin composition which comprises
  (i) reacting dicyclopentadiene or hydroxylated dicyclopentadiene with maleic anhydride or acid at a temperature of 150° C. or lower to yield partially esterified dicyclopentadienecarboxylic acid, which is further reacted with a monoglycidyl ether or ester at a temperature of 200° to 220° C. in the absence of a catalyst or at a temperature of 80° to 120° C. in the presence of a catalyst to yield a compound (A) having active hydrogen and an acid number of 15 or less,
  (ii) reacting the compound (A) having active hydrogen with a butadiene homopolymer or copolymer (B) having one or more hydroxyl groups and number average molecular weight of 1000 to 5000 and a diisocyanate (C) in ratios 0.6–1.0/1.0/1.2–2.0 in terms of functional group equivalent ratio of (A)/(B)/(C) at a temperature of 150° C. or lower to yield a polybutadiene derivative, and
  (iii) dissolving or mixing the polybutadiene derivative in or with a polymerizable monomer having at least one polymerizable double bond in the molecule.

9. A process according to claim 8, wherein the polymerizable monomer is styrene.

* * * * *